April 26, 1966

J. A. BRENT ET AL 3,248,233

ESSENCE RECOVERY

Filed June 2, 1964

INVENTORS
JEWELL ALLEN BRENT
CLARENCE W. DUBOIS
BY CARL F. HUFFMAN

Kenyon & Kenyon
ATTORNEYS

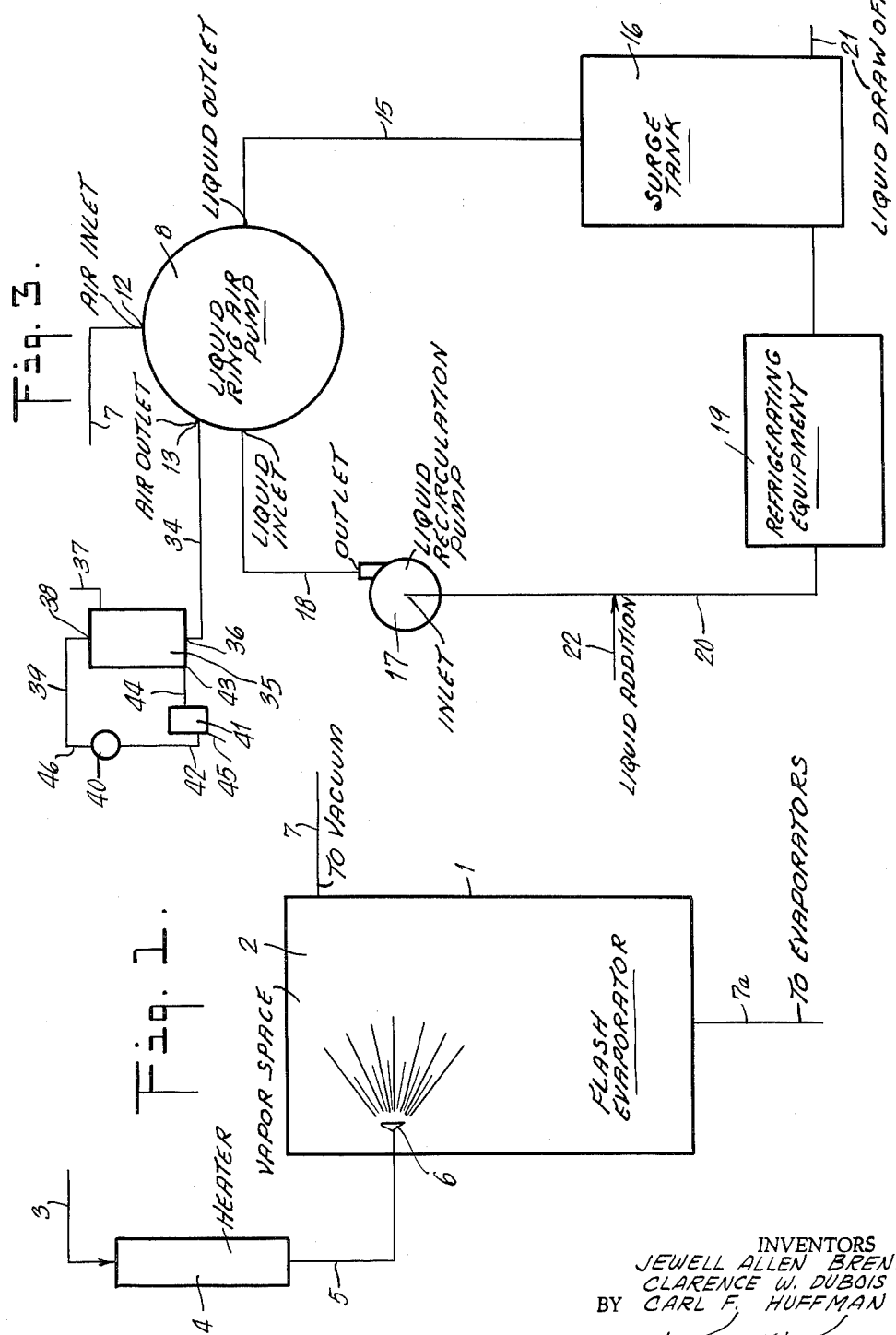

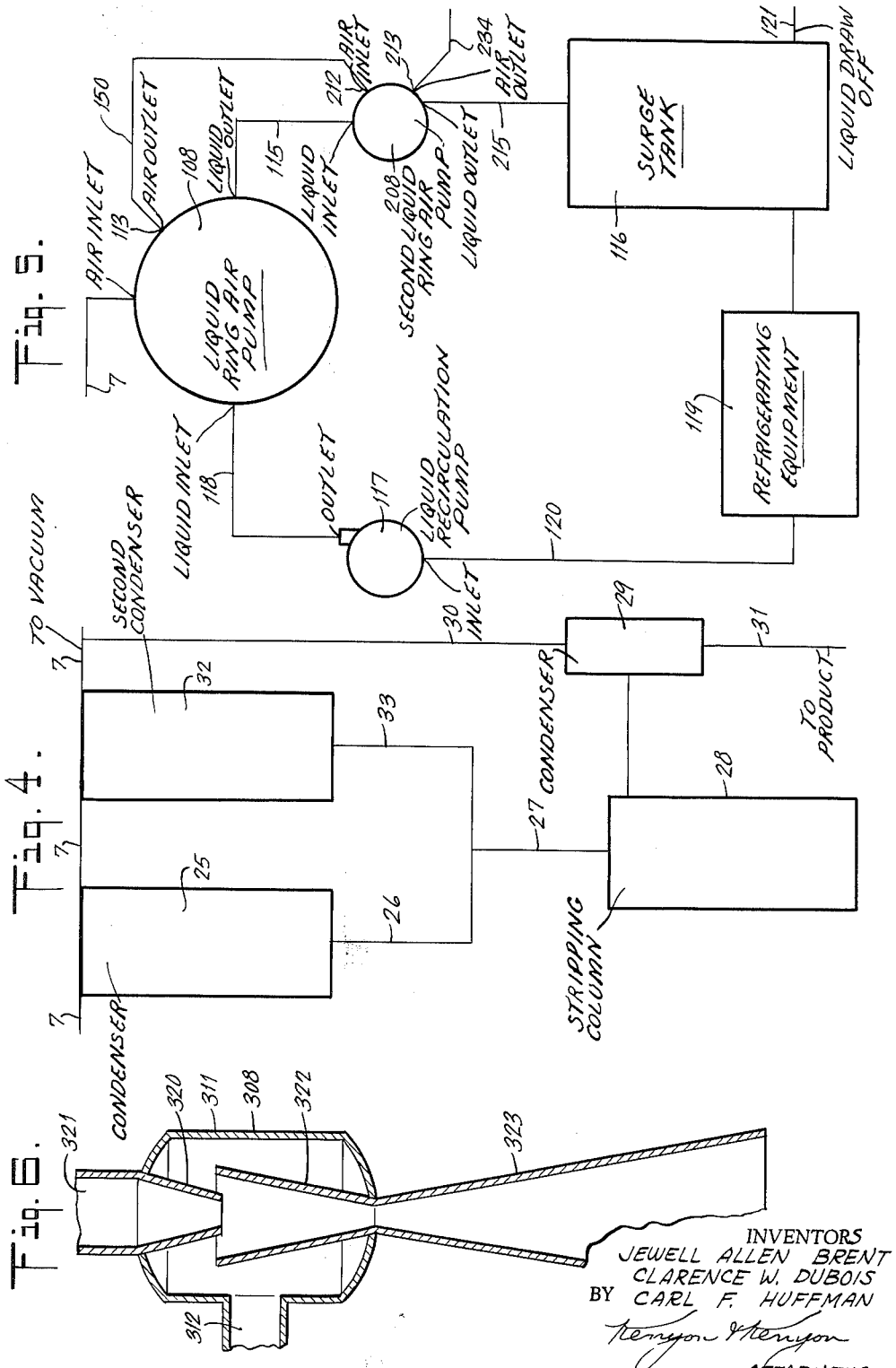

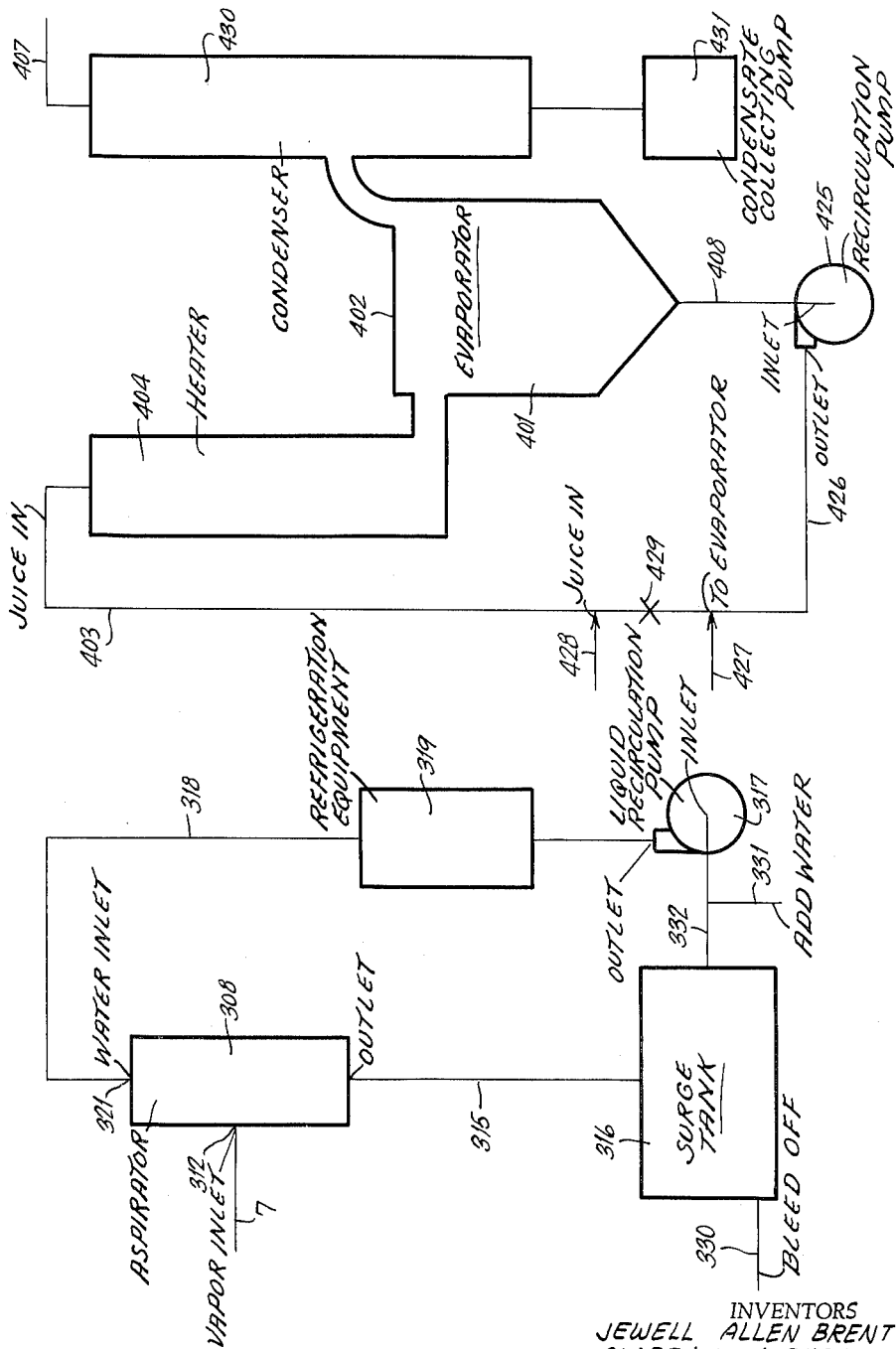

INVENTORS
JEWELL ALLEN BRENT
CLARENCE W. DUBOIS
BY CARL F. HUFFMAN
Kenyon & Kenyon
ATTORNEYS

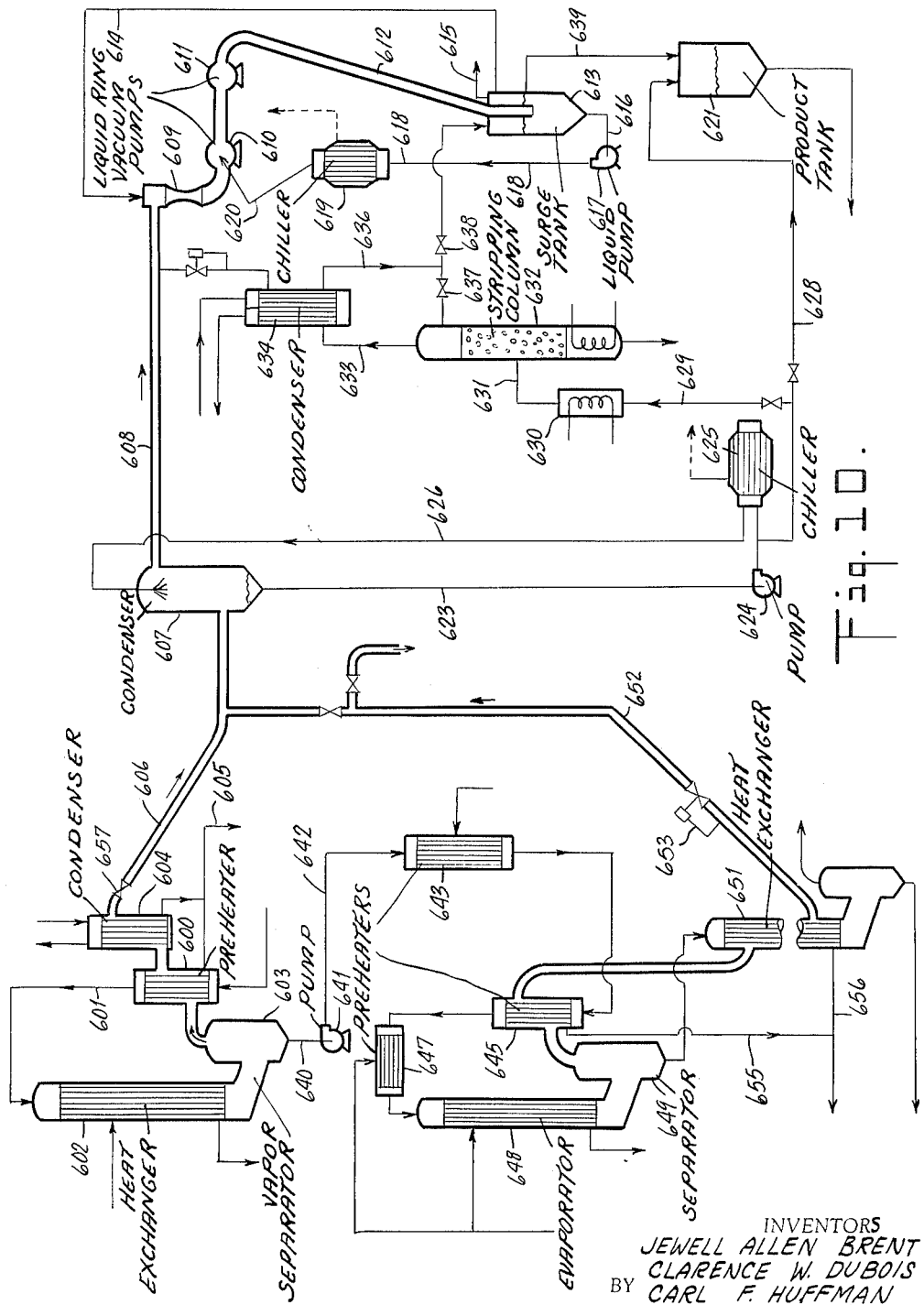

United States Patent Office 3,248,233
Patented Apr. 26, 1966

3,248,233
ESSENCE RECOVERY
Jewell Allen Brent, Maitland, Clarence W. Du Bois, Orlando, and Carl F. Huffman, Maitland, Fla., assignors to The Coca-Cola Company, Atlanta, Ga., a corporation of Delaware
Filed June 2, 1964, Ser. No. 372,008
6 Claims. (Cl. 99—205)

This application is a continuation-in-part of our application Serial No. 138,879, filed September 18, 1961, for Essence Recovery and now abandoned.

This invention relates to new and improved methods and apparatus for recovering essence from orange or other fruit juice concentration for return to the juice after concentration so as to impart thereto the natural flavor and in particular to such recovery from concentration of the juice in vacuum concentrating equipment.

The essence referred to here consists generally of the various alcohols, esters, aldehydes, and other volatile constituents which occur in fresh orange, citrus and other fruit juice and impart a natural flavor thereto. This essence is mostly water-soluble but quite volatile, and in normal vacuum concentration of the juice is removed so that the concentrate is lacking in the essence and, consequently, when reconstituted does not have the natural flavor of fresh juice.

It is difficult to recapture the essence because it is present in extremely small quantities and in very low concentration. This is particularly true in a vacuum concentration system. There the essence comes off in the evaporator under vacuum along with the water vapor and other gases present in the juice, such as oxygen, nitrogen and carbon dioxide which have been entrained or dissolved in the juice before it reaches the evaporator.

The water vapor may be removed in condensers operating above or near the freezing point of water, but the remaining gases which may be termed non-condensable gases because they do not condense appreciably under the conditions involved and the essence remain.

Even after removal of the water the concentration of essence in the other gases is very low and in commercial vacuum concentrating operations is aggravated by inevitable inward leakage of air.

Prior attempts to collect the volatile flavor elements or essence from evaporator concentration of juice and particularly vacuum evaporator concentration of juice have been inefficient because of incomplete recovery of the essence even though they have employed extremely low temperatures and expensive equipment.

Heretofore, attempts have been made to condense the essence under vacuum and remove it from the non-condensable gases with cold wall condensers. These operate at extremely low temperatures and are expensive both in installation and operation.

Furthermore, it has not been practical to separate the essence from the non-condensable gases by means of scrubbers when they are operated under high vacuum.

The present invention obviates the aforementioned difficulties and results in the recovery of large percentages of the essence in vacuum concentration systems with little added investment in equipment and high efficiency.

One of the objects of the present invention is to provide a new and improved method and apparatus for recovering the essence from citrus or other fruit juices.

Another object is to provide a method and apparatus which are efficient and which do not depend entirely on the use of extremely low temperatures.

Another object is to provide a method and apparatus which is effective in obtaining very high recoveries of essence efficiently and inexpensively in a vacuum concentrating system.

Another object is to provide method and apparatus in which the essence is released from the juice in a vacuum environment in which the vacuum is created by picking up and entraining the volatiles, including the essence, by entraining them in the vapor state in a stream of water or other suitable liquid with which they are intimately intermingled for condensation and dissolution.

Another object is to provide such method and apparatus in which the stream of water or other suitable liquid may be cooled to assist in condensation and dissolution of the vapors to be recovered.

Another object is to provide such method and apparatus in which liquid and the intimately intermingled and closely associated volatiles including the essence, are subjected to an increase in pressure along with the non-condensable gases to facilitate and increase the take up of the volatiles including the essence by the liquid, after which unabsorbed or undissolved, non-condensable gases are separated from the liquid.

Another object is to provide method and apparatus in which the volatiles from juice extraction are picked up through the use of a liquid ring type of vacuum pump.

Another object is to provide method and apparatus in which a liquid ring type of vacuum pump is employed to both entrain and intermingle the liquid which is to take up the essence with the essence and to simultaneously increase the pressure on the liquid, the essence and the non-condensable gases to assure high pickup of the essence in the liquid of the pump and for separation of the non-condensable gases and elimination of them from the vacuum system and the liquid.

Another object is to provide method and apparatus in which the volatiles are picked up and a vacuum created with a liquid jet exhauster.

Another object is to provide a method and apparatus in which a liquid jet exhaust is provided to intimately intermingle the liquid of the jet with the essence and non-condensable gases to be taken up by the liquid and to increase the pressure on the liquid, the essence and the non-condensable gases to increase the pickup of essence by the liquid and to eliminate the non-condensable gases from the vacuum system and the liquid in which the essence is picked up.

Another object is to provide a method and apparatus in which when the essence is flashed off it is subsequently freed from the major portion of the water which accompanies it before it is condensed.

Other objects and advantages of the invention will appear from the following description of the invention where examples thereof which are of proven efficacy are given by way of illustration.

In the drawings accompanying the specification there are shown diagrammatically the necessary elements of a system for practicing the invention.

FIG. 1 is a diagrammatic view of a flash evaporator for use as part of the system employed in carrying out the invention.

FIG. 3 is a diagrammatic view of a liquid ring pump circuit suitable for use in connection with the flash evaporator shown in FIG. 1 for carrying out the invention.

FIG. 4 is a diagrammatic view of equipment suitable for freeing the essence from part of the water which flashes off when the essence is flashed off the juice.

FIG. 5 is a diagrammatic view of an alternate liquid ring pump circuit suitable for use in carrying out the invention with the flash evaporator of FIG. 1.

FIG. 6 is a sectional view of a jet exhauster suitable for use in carrying out the invention.

FIG. 7 is a diagrammatic view showing a jet exhauster circuit suitable for use in carrying out the invention along with the flash evaporator of FIG. 1.

FIG. 8 is a diagrammatic view of a Majonnier or similar conventional vacuum evaporator circuit suitable for use in the system in place of the flash evaporator of FIG. 1; and FIGS. 9 and 10 are diagrammatic views of additional systems employing the invention.

Figure 2:
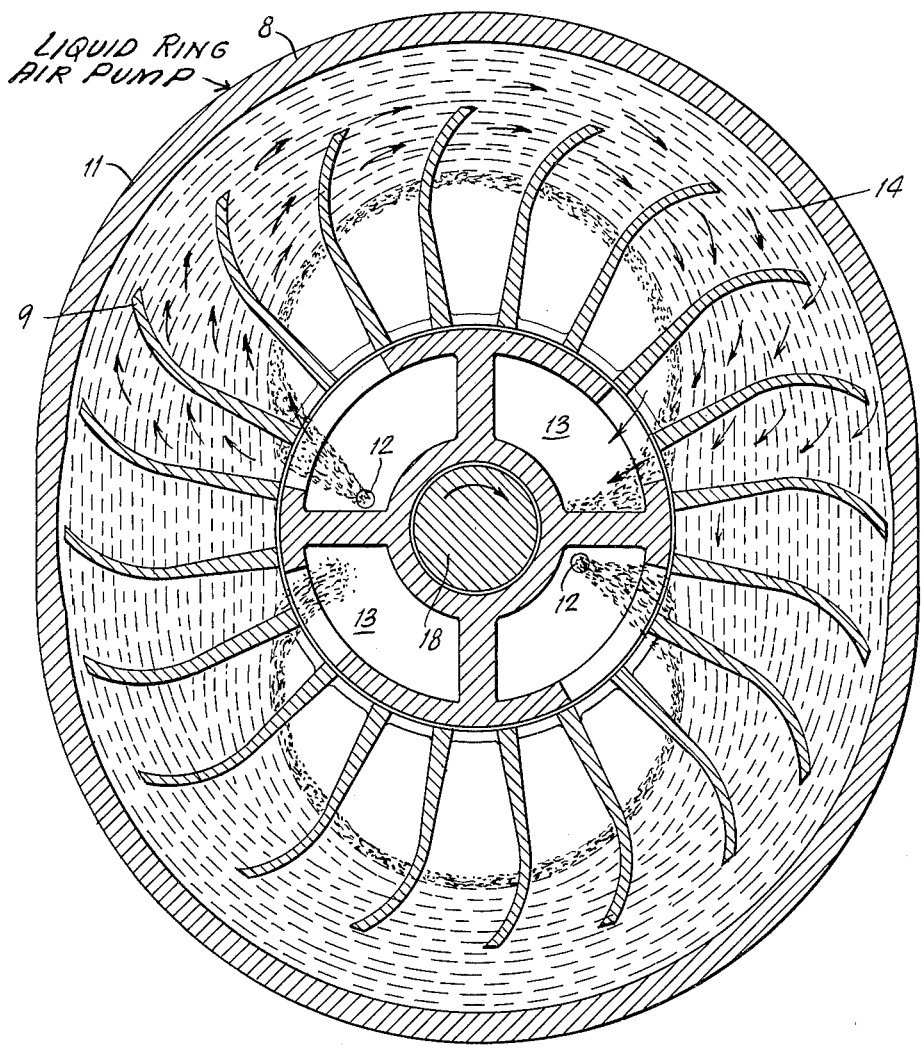
FIG. 2 is a cross-sectional view of a liquid ring pump suitable for use in connection with the invention.

In practicing the invention here involved, single strength fresh orange juice is subjected to a flash evaporation in which from 15% to 20%, or as little as 5%, of the liquid is evaporated in a vacuum flash evaporator. This operation removes substantially all of the alcohols, esters, aldehydes and other volatile flavor constituents which go to make up the flavor essence of the fresh orange juice.

The juice which has been stripped of the essence in this way is then passed on to conventional concentrating equipment such as vacuum concentrators.

The vacuum for the flash vacuum evaporator is created by making use of a stream of water or other liquid capable of condensing and absorbing or dissolving the vaporized essence, which stream entrains the vaporized essence and becomes intimately mixed and associated therewith.

Generally, the essence which has been flashed off is freed from excessive water vapors by means of condensers adapted to condense the water vapors before the essence is entrained in the stream of liquid.

The stream of liquid used to create the vacuum may be the liquid seal of a liquid ring pump or it may be the jet stream of a jet exhauster or aspirator.

Both of these devices, although somewhat different in nature, pump gases by making use of a stream of liquid which comes into intimate contact with said gases, and both in their operation increase the pressure on the gases and intimately associated liquid prior to discharging the gases so that these gases in so far as they separate from and are not taken up by the liquid may be discharged from the device, for instance, into the atmosphere.

The vacuum condition for concentration of the juice is brought about by the pump or aspirator along with the condensation of the water vapors pulled from the vacuum chamber of the evaporator. The essence in gaseous phase, along with the non-condensable gases such as oxygen and nitrogen, partially freed from water vapors, is carried out of the evaporation system by the pump or aspirator. The essence and non-condensable gases come into intimate contact with the stream of liquid and tend to be entrained thereby. After removal from the low pressure area of the vacuum system, the essence, the non-condensable gases and the liquid of the stream are subjected to forces tending to increase the pressure thereon. This results in the absorption and dissolution of a very high percentage of the essence in the water of the liquid stream where the essence is collected and thus concentrated.

The non-condensable gases, which are little soluble in the water, are vented and, since the water is no longer under vacuum when it is withdrawn from the system, it retains the essence just as the orange juice did originally at atmospheric pressure.

The operation of bringing the pressure over the water to atmospheric or higher may be accomplished in a single stage or by a plurality of stages.

When the liquid ring pump is employed the operation of the pump with its water seal serves to separate the essence from the non-condensable gases even though the concentration of the essence in these gases is very low and even though the system is operated under a high vacuum in a vacuum system.

The same effect is obtained when a liquid jet exhauster or aspirator is employed.

In each case, the liquid ring pump or the liquid jet aspirator merely replaces the apparatus formerly used to bring about the creation of the vacuum thus involving little capital expenditure.

The stream of liquid is preferably refrigerated to lower the vapor pressure of the liquid and thereby allow a higher vacuum to be reached and also to assist it in condensing the vapors and dissolving and retaining them, and the pump or jet exhauster is set up either to operate on a batch principle in which, when the liquid has achieved a certain concentration of essence, it is replaced by fresh liquid; or, in a continuous operation, where portions of the liquid are bled off and replaced as the concentration of essence reaches the desired point.

The essence thus recovered may be added back to juice concentrate or may be used separately or may be employed for any other purpose.

The system is simple and easy to operate and is highly efficient in recovering substantially all of the essence from the fresh juice.

Referring to the drawings, in FIG. 1, there is shown diagrammatically a flash evaporator 1 which has an enclosed vapor space 2. Fresh juice is fed through a line 3 to a heater 4 which, in the case of fresh orange juice, may instantaneously carry the temperature to 195° F. or above, and in the case of some other juices, even to 212° F. The juice then passes through a line 5 to a spray nozzle 6, where it is sprayed into the enclosed space of the flash evaporator.

The flash evaporator is a vacuum type and is operated at a vacuum of about 25 mm. A line 7 leads to the vacuum equipment and a line 7a is provided to carry the stripped juice to the conventional evaporators.

In the flash evaporator, from 10 to 15% of the liquid is removed from the fresh juice and with it substantially all of the essence is removed.

The line 7 extends to the vapor inlet of a liquid ring air pump 8 and is connected to the vapor inlet.

A suitable liquid ring pump is illustrated somewhat conventionally in FIG. 2. This pump has a multiple bladed rotor 9 disposed for rotation on a central shaft 10. The pump is provided with an elliptical casing 11, air inlets 12, and air discharges 13. Within the pump there is maintained a seal 14 of liquid which is rotated about the casing by means of the rotor, and because of the shape of the casing and the disposition of the rotor, gas is drawn into the inlet by the outward motion of the water as it passes beyond the inlet under the urge of the impeller, and is expelled at the discharge by the constriction of the water into the narrower portion of the casing, as indicated in FIG. 2. The gases and vapor entering the pump are entrained and are intermingled with the water or other liquid forming the seal and because of this are condensed and dissolved, depending upon their physical properties.

In the present operation the vapors, including the essence, are condensed and the essence being soluble in water tends to dissolve in the water of the liquid seal.

As will be seen from a consideration of FIG. 2, and particularly the upper lefthand portion thereof, the gases consisting mainly of the non-condensable gases such as oxygen and nitrogen and the essence, are pulled into the pump through the inlet 12 and pass into the spaces between the blades 9 as they rotate in a clockwise direction. As rotation continues the space between the blades, which is not occupied by the liquid of the seal 14, increases in volume while the stream of liquid or water forming the seal tends to follow the eccentric casing due to centrifugal force. As rotation continues, the gases are trapped between the vanes of the rotor and they are compressed as the rotation continues toward the discharge 13.

The non-condensable gases and the essence are thus brought into intimate contact with the water and are compressed and due to the action of the vanes the intimacy of contact is increased by entrainment of some of the gases in the liquid stream of the seal.

In a typical case the pump reduces the pressure of the gases at its inlet to about 15 mm. of mercury and raises the pressure on the gases passing through to atmospheric pressure or higher, namely, about 760 mm. of mercury, so that the gases may be vented or discharged into the atmosphere.

In the preferred form of the invention, as indicated above and as described in more detail later, the liquid is refrigerated to about 35° F.

There is thus created a condition in which the absorption or dissolution of the essence in the water of the liquid seal is greatly promoted. The amount of essence in the gaseous phase in the vent gases passing through the outlet 13 is reduced to about 1/50 of the amount of essence in the gaseous phase at the inlet where the pressure is about 15 mm. of mercury.

The total amounts of essence involved are very small and the concentrations are very low and by the practice of this invention it is possible to avoid the discharge of significant quantities of the essence in the vent gas, particularly certain elements of the essence which have high volatility and contribute significantly to the flavor of the juice.

At 15 mm. of pressure very little of the more volatile components of the essence will remain in solution in water. Thus a discharge of vent gases without increasing the pressure would result in very high losses of essence. However, when this invention is employed, only about 1.8 or 2% of the total essence of the original juice finds its way into the vent gases.

Theoretically, at equilibrium conditions, there would be substantially no loss at all although in practice the losses may run somewhat higher than theory would indicate.

The recovery of the most volatile components of the essence from practicing this invention will run five times as much as that obtained through the use of a cold wall condenser in a vacuum system, ahead of the discharge, having a wall temperature of −103° F.

The pump circuit is shown diagrammatically in FIG. 3. The seal water flows or is discharged through the line 15 to a surge tank 16. A recirculation pump 17 is provided in the circuit, discharging through line 18 into the casing of the pump, and the water or other liquid forming the seal is forced by the pump 17 into the pump casing, flowing out again through line 15 to complete the refrigeration circuit. Suitable refrigerating equipment 19 may be supplied, and it is desirable to maintain the temperature of the liquid between 32 and 40° F., although satisfactory results are achieved if the temperatures run as high as 80° F. When the liquid is refrigerated the essence will condense or dissolve more readily and less essence will be lost in the gas discharge.

A line 20 leads from the refrigeration equipment to the recirculating pump 17, and a line 21 is provided for drawing off liquid from the surge tank 16.

In operation of this system the water may be recirculated until it has acquired the desired concentration of essence. It may then all be removed and replaced. It is also possible to bleed off small amounts through line 21 when the concentration has reached a certain point, replacing liquid if necessary through line 22.

The non-condensable gases separated from the liquid seal in the pump are vented through outlet 13 substantially free of any of the water soluble essence.

The details of the pump are conventional and will be understood by those skilled in the art. Such pumps are available commercially from the Nash Engineering Company of South Norwalk, Connecticut, and similar pumps may be obtained elsewhere on the market.

In the preferred form of the apparatus and method the vaporized essence from the flash evaporator is freed from most of its water vapor. Suitable apparatus for eliminating most of the water vapor is shown in FIG. 4. The line 7 leading from the flash evaporator leads first to a condenser 25 where the temperature may be from 30° to 40° F. In this condenser the bulk of the water vapor is condensed and may be run off through a line 26 which leads to a line 27 and thence to a scrubber or stripping column 28 where such of the essence as has been condensed may be stripped from the liquid and passed to a condenser 29 where the more easily condensable essence is recovered. Such a condenser would operate at approximately 0° F.

The vapors which are not condensed in the condenser 29 pass through line 30 back to line 7 and thence pass to the Nash pump or the aspirator as will be described hereafter. The condensed material is drawn off through line 31 to be added to the essence on its way back to the condensed juice. If preferred, this material may be added to the liquid of the pump seal instead of water through the line 22, to replace liquid drawn from this circuit.

The line 7 may also lead to a second condenser 32 which may be run at from −30 to −70° F. Here additional water vapor is condensed and possibly some of the essence, although 95% of the water is removed, in condenser 25.

The condensate from condenser 32 passes through line 33 and line 27 to the scrubber or stripping column 28 and such essence as is stripped from the liquid passes to condenser 29. The portion not condensed there passes through line 30 up to line 7 on the way to the pump or aspirator, to be described later, while the condensate passes through line 31 to the other recovered essence for addition back to the concentrated juice.

In operations the condenser 25 may also be run at a temperature of from 60° to 80° F. In this case, the bulk of the water vapor is condensed and may be run off through line 26 to be discarded because such concentrate contains only a small quantity of the essence.

In such case, the non-condensable gases together with substantially all of the essence in vapor form, would pass through line 7 to condenser 32 which would be operated at a temperature of 32 to 35° F. The condensate from this condenser operated at this temperature would be taken through line 33 to a stripping column 28 or if less concentrated essence were desired the condensate could be sent on to be used as seal water.

In such operation, vapors not condensed in condenser 32 would pass to the Nash pump or aspirator.

When a stripping column is used to increase the fold or strength of the essence, the essence which is stripped from the liquid passes to condenser 29 which may be operated at 32 to 35° F. The uncondensed gases and essence then pass through line 7 to the pump or aspirator. The other essence may be added back to concentrated juice.

Certain elements of the essence which constitute a very small portion thereof, consisting of various sulphides, are not completely retained in the water of the liquid seal of the pump. They are generally sulphides or the like which do not dissolve readily in the water of the liquid seal, but may be dissolved in liquids such as orange oil pressed from the peel or in highly concentrated solutions of essence which contain a high concentration of alcohol. In order to recover these substances, the vent gases from the pump 8 may be led through line 34, to a scrubber 35, where the gases are scrubbed with scrubbing liquid. The gases enter at the bottom of the scrubber 35 at 36, and are vented at 37. The scrubbing liquid is introduced at the top at 38, through line 39, from pump 40, which picks up the scrubbing liquid from a surge tank 41, through line 42. The scrubbing liquid may be tapped from the bottom of the scrubber at 43 through line 44 which carries it to the surge tank. When the liquid has absorbed the desired quantity of the aforementioned elements of the essence, it may be drawn off at 45 or may be bled off, in which case additions of fresh scrubbing liquid may be made through line 46.

In carrying out this process a typical case involving 500 gallons of fresh juice will involve flashing off about 100 gallons or 20% of the liquid along with the essence.

In some instances, with 500 gallons of fresh juice, one will flash off about 50 gallons or 10% of the liquid along with the essence.

In the condensers 25 and 32 approximately 90 gallons of liquid are condensed. These consist of about 95 gallons of water and about three gallons of concentrated essence. In the Nash pump or aspirator to be described, about two gallons of essence are recovered. This is about one hundredfold concentration. The essence from condenser 29 consisting of about three gallons and the essence. In the Nash pump or aspirator to be described, gallons, are combined and added back to the concentrated juice.

If as pointed out above, as an alternate the condenser 25 is operated at 60 to 80° F., about 45 gallons of liquid will be condensed. When the condenser 32 is operated at 32 to 35° F. it will condense about 4 gallons of essence. In the Nash pump or aspirator which is described later, about 1 gallon of essence will be recovered.

In such case, the essence from condenser 32 may be combined with the essence from the Nash pump to give 5 gallons of essence of approximately one hundredfold or the essence from condenser 32 may be reduced in volume to about 1½ gallons in the stripping column 28 which when combined with the essence from the Nash pump produces 2½ gallons of essence of about two hundredfold. In either event, these combined essences may be added back to the concentrated juice.

In FIG. 5 there is shown diagrammatically an alternating pump circuit employing two liquid ring pumps 108 and 208. The line 7 leads into the pump 108, as it does to the pump 8 in the form of invention illustrated in FIG. 3. The line 115 leads to the second pump and a line 215 leads from the second pump to the surge tank 116. 119 is the refrigerating equipment, 117 the recirculating pump, and the lines 118 and 120 correspond to the lines 18 and 20 of the form of invention shown in FIG. 3.

The gases vented from pump 108 through vent 113 corresponding to the discharge 13 of the pump 8, pass through a line 150 to the gas inlet 212 of pump 208. The vent gases are discharged from the discharge 213 through a line 234 corresponding to the line 34 of FIG. 3. They may pass to a scrubbing tower similar to that shown in FIG. 3 for collection of the small amounts of sulphide vented from the pump.

In this form of invention the two pumps 108 and 208 tend to give more complete recovery of the essence.

The diagrammatic illustration of FIG. 5 is intended to encompass two independent pumps in series in a single housing.

In the operation of this particular form of the invention, the pressure in line 7 will be generally in the neighborhood of 15 mm. of mercury. The pressure of the gas at discharge in pump 108 may be from 200–250 mm. of mercury which will be essentially the pressure at the inlet 212 at pump 208. The discharge through vent 213 will be at atmospheric pressure. It will be understood that in any of these cases a booster may be employed at the inlet of any or all of the pumps 8, 108 or 208.

If desired, a 32° condenser may be inserted between the flash evaporator and the pump in line 7.

The invention may also be carried out using a water aspirator or jet exhauster in place of the liquid ring pump. Such a water aspirator or jet exhauster is illustrated diagrammatically in FIG. 6, and in FIG. 7, the circuit for use of this aspirator is shown diagrammatically.

The flash evaporator employed may be like that shown in FIG. 1, and the line 7 leads to the inlet of the jet exhauster or water aspirator which is indicated at 308 in FIGS. 6 and 7.

The jet exhauster or water aspirator consists generally of a casing 311 having a vapor inlet 312; a jet 320 having a water inlet 321 discharges into the casing and into the throat of a Venturi 322 which is provided with a tapered outlet 323.

The stream of water is forced through the jet into the Venturi opening and the gases which are entrained and intermingle with the jet or stream of water enter through the inlet 312 to which the line 7 from the flash evaporator leads. The discharge 315 from the jet leads to a surge tank 316, and a line 332 leads to a recirculating pump 317 which leads to a refrigeration unit 319, by means of which the liquid circulating in the system may be brought down as low as 33° F., preferably between 32 and 40° F., although as in the case of the liquid ring pump the temperature may be as high as 80° F.

Line 318 leads from the refrigerator to the inlet 321 of the aspirator.

The operation is similar to that when the liquid ring pump is employed. The jet of water picks up and entrains the vapor including the vaporized essence and condenses and dissolves the same. The water is recirculated by the pump 317, and it may be recirculated until it has picked up the desired concentration of essence. It is possible also to bleed off a small portion of the liquid, using the line 330 therefor, and additional water may be added, if desired, through the line 331.

In operating the jet exhauster the pressure at the inlet 312, will be in the neighborhood of 15 mm. of mercury and the non-condensable gases such as oxygen and nitrogen and the gaseous essence will, in the operation be compressed to atmospheric or slightly higher pressure so that as in the case of the rotary pump, the amount of essence in the vent gases will be materially less than in the gas in the vacuum system.

The details of the jet exhauster or water aspirator form no part of this invention. Such exhauster or evaporators are available commercially and may be purchased at Schutte & Koerting Company of Cornwell Heights, Pennsylvania, or others on the market.

In FIG. 8 there is shown an evaporator consisting of a vessel 401 having a closed evaporation space 402, a heater 404, and a line 403 for the fresh juice.

There is a draw-off 408 leading to a recirculating pump 425 which has a discharge line 426 adapted to carry through a discharge 427 to the conventional juice evaporators. An inlet 428 for fresh juice is provided, and a cut-off 429 which may be reopened for recirculating. A condenser 430 is provided which leads through line 407 through the pump or aspirator. 431 is a condensate-collecting pump.

In operation of this system and method, the fresh juice may be heated to about 190° F. or above, in the case of orange juice in the preliminary heater of the flash evaporator. When it is sprayed into the vacuum chamber, it will cool down to about 110° F. or 80° F.

The pump or aspirator will apply a vacuum of about 35 mm. or 25 mm. to the evaporation space and substantially all of the volatile essence will be removed.

This will be recovered in large measure in the pump or aspirator liquid, and the essence is thus not lost in the concentration of the juice, so that it may be returned to the juice for preserving in the concentrate the same or substantially the same flavor as in the fresh juice when the concentrate is reconstituted.

The equipment employed in the combination is already available, tried and tested equipment, and through the arrangement and operation thereof has indicated that it is possible to obtain almost full recovery of essence.

Figure 9:
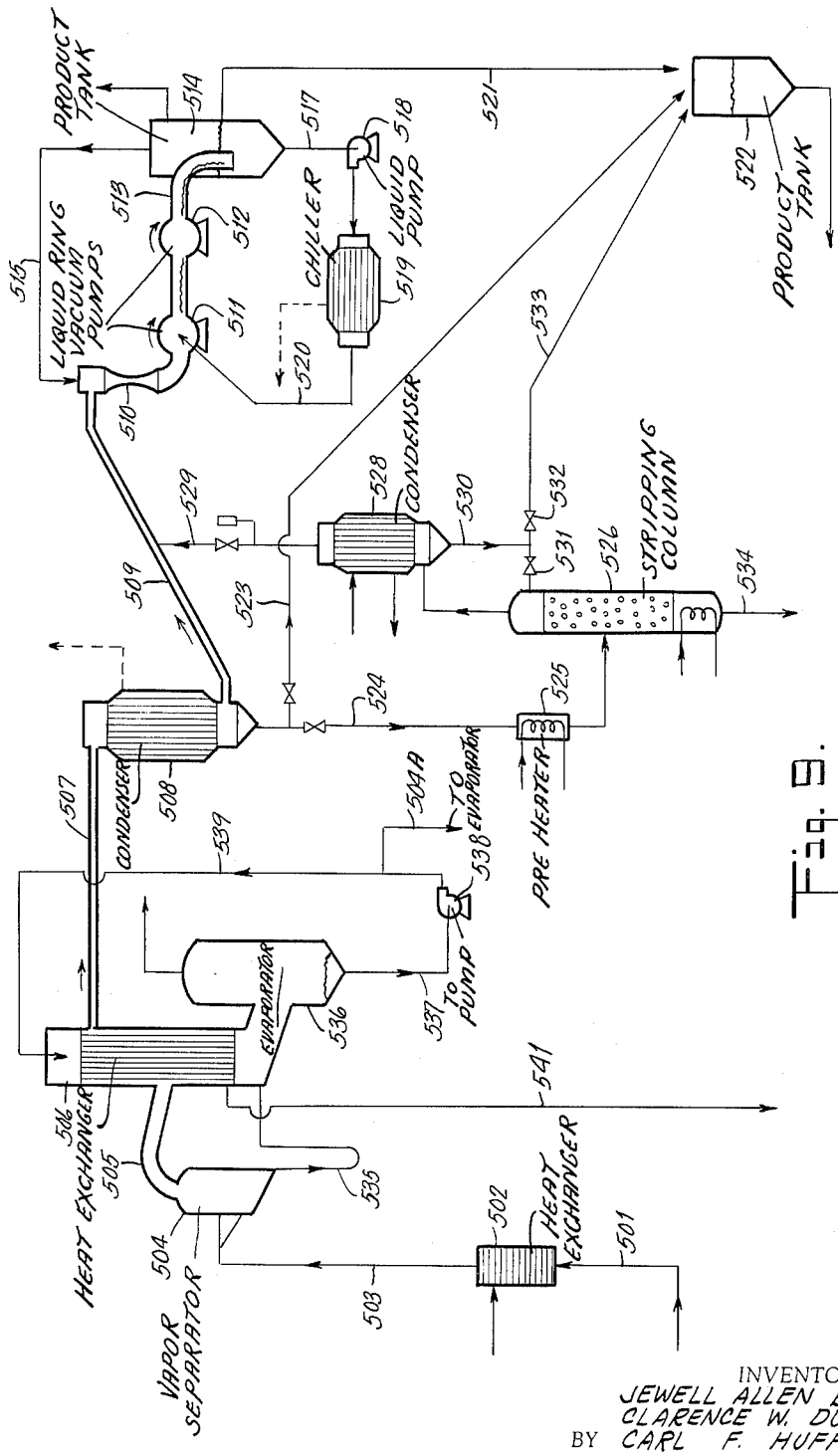

FIG. 9 shows diagrammatical system for continuous removal of volatiles from the liquid or juice.

The juice which, in this case, is orange juice, but may be other fruit juices or other liquid containing volatiles at atmospheric pressure and temperature is conducted through line 501 to a plate heat exchanger 502 where it is heated to approximately 190° F. It then flows through line 503 to a vapor separator 504.

In the separator 504, the juice at 190° F. is subjected to reduced pressure which brings about a partial evaporation of the juice and the separation of vapors containing volatiles such as essence from the partially evaporated juice.

The partially concentrated juice flows through line 535 into an evaporator 536. After evaporation, this juice may be carried through line 537 and pump 538 and line 539 to the tube section of a heat exchanger 506 where heat is transferred from vapors emerging from the vapor separator 504 through line 505 into the chest section of heat exchanger 506. This results in further concentration of the juice which may be pumped through line 504A to other equipment for further concentration or for use in its then state of concentration.

Vapors entering the chest of heat exchanger 506 are partially condensed and may be carried through line 541 either to waste or to a stripping column 526.

In the chest section of the heat exchanger 506, conditions are controlled to produce a condensate having a temperature of 75 to 85° F. which may be discarded with little loss of volatiles.

Uncondensed vapors emerging from the chest of the heat exchanger 506 contain volatiles concentrated to 80 to 100 times their concentration in the original juice and are conducted through the line 507 into a condenser 508 which may be a refrigerated tubular condenser or a direct contact condenser.

The condensate from the condenser 508 may be conducted through line 523 into a final product tank 522 or it may be concentrated further by passing through a line 524, preheater 525 and into the stripping column 526. The stripped condensate from the column 526 is conducted through line 524 to waste.

Vapors from the stripping column 526 are led through line 527 into condenser 528. Condensate from this condenser is conducted through line 530. A portion may be returned to the column as reflux through valve 531 with the remainder passing through valve 532 and line 533 into product tank 522.

Uncondensed vapors from condenser 508 and condenser 528 are combined at the junction of lines 509 and 529 and enter the gas jet 510 which raises the absolute pressure to approximately 50 mm. Hg.

The vapors are then combined with cold water or product in liquid ring vacuum pump 511 of the type described above which scrubs the uncondensed vapors either with water or product and raises the absolute pressure to approximately 200 mm. Hg. The mixed vapors and liquid are then conducted into liquid ring vacuum pump 512 which performs a further scrubbing of the vapors and raises the absolute pressure to approximately 760 mm. Hg in the manner described above.

The liquid and scrubbed vapors are then ejected through line 513 into an intermediate product tank 514 which is vented to the atmosphere. Most of the non-condensed gases comprising the headspace of tank 514 are conducted through line 515 into gas jet 510 and pumps 511 and 512 where the noncondensed gases are again scrubbed with liquid product.

The ratio of the gas returned for scrubbing to the gas vented to the atmosphere is approximately 20 to 1. Thus, essentially, the noncondensable gases are scrubbed 20 times before venting to the atmosphere. This repeated scrubbing results in an exceedingly low loss of volatiles to the atmosphere and high retention of them in the product.

Part of the product is diverted continuously from intermediate product tank 514 through line 521 to the final product tank 522. The rest of the product in tank 514 is recirculated continuously through line 517, pump 518, chiller 519 and line 520 back to the pumps 511 and 512 where it serves as the seal liquid and continuously scrubs essence from the carrier gases.

The scrubbing of the product from carrier gases is much more efficient at atmospheric pressure than at subatmospheric pressure. Consequently, the recovery is much higher than could be obtained at lower pressures.

FIG. 10 is another diagrammatical showing of a system employing the invention. The juice with the natural volatile essence is fed through a tubular preheater 600 and lines 601 into the tube bundle of heat exchanger 602 and vapor separator 603. In passing through the preheater and heat exchanger, evaporation occurs to the extent of 7–7½% of the juice. The temperature of the partially concentrated juice and the essence bearing vapors in vapor separator 603 is approximately 120° F. Boiling temperature is controlled by vacuum regulator 657.

Water and essence vapors from the vapor separator 603 are partially condensed in the chest of the juice preheater 600 and in a water cooled condenser 604. The condensates from the preheater 600 and the condenser 604 are conducted through line 605 to waste or to stripping column 632 if further recovery of essence is desired.

The uncondensed vapors emerging from condenser 604 are conducted by a vapor line 606 through the vacuum regulator 657 at which point the vapors are subject to absolute pressure of 10–25 mm. Hg as provided by gas jet 609 and the liquid ring pumps of the Nash type 610 and 611.

The vapors are drawn through line 606 into direct contact condenser 607 where water soluble essence components are dissolved and non-condensable gases are scrubbed by cold water or product, i.e. concentrated essence. The scrubbing liquid is recirculated from condenser 607 through line 623, pump 624 and into chiller 625 where the temperature is reduced to 35° F. From the chiller 625 the cold scrubbing liquid is returned to condenser 607 through line 626. A portion of the scrubbing liquid is continuously diverted through line 628 to final product tank 621 or through line 631 to stripping column 632 if further concentration is desired.

Stripped condensate from column 632 is conducted to waste. The vapors are conducted through line 633 into tubular condenser 634. Condensate from this condenser is conducted through line 636 through valves 637 and 638 which may divert part of the condensate to column 632 as reflux or to the intermediate product tank 613 as product.

Uncondensed vapors from direct contact condenser 607 and from tubular condenser 634 are combined in line 608 and are drawn into gas jet 609 which raises the absolute pressure to approximately 50 mm. Hg. The vapors are then combined with cold water or product in the liquid ring pump 610 which is of the type described above which scrubs the non-condensed vapors and raises the absolute pressure to approximately 200 mm. Hg. The mixed vapors and liquid are then conducted into liquid ring pump 611 which performs further scrubbing of the uncondensed vapors and further raises absolute pressure to approximately 760 mm. Hg.

The liquid product and scrubbed vapors are then ejected into intermediate product tank 613 at atmospheric pressure. Tank 613 is vented to the atmosphere to line 615.

Approximately 1/20 of the non-condensed gases are allowed to escape to the atmosphere and the balance are conducted through line 614 back to the gas jet 609 and the liquid ring pumps 610 and 611 for further scrubbing.

Part of the product is diverted continuously from tank 613 through line 639 to the final product tank 621. The rest of the product in tank 613 is recirculated continuously through line 616, pump 617 and line 618 to chiller 619 where it is cooled to about 33° F. From chiller 619 the product or scrubbing liquid is conducted through line 620 back into the seals of the liquid ring pumps where it continuously scrubs the essence from the uncondensed gases.

Additional volatile essence components may be stripped from the juice by conducting the partially concentrated juice at 120° F. from vapor separator 603 through lines 640, pump 641 and line 642 through preheaters 643, 645 and 647 into evaporator 648. In passage through evaporator 648, an additional 17% evaporation of the juice is obtained and the partial concentrated juice and water and essence vapors have a temperature of approximately 190° F. with boiling temperature governed by vacuum regulator 653.

Partially concentrated juice from separator 649 is conducted to the tube bundle of heat exchanger 651 and to further evaporator stages for concentration.

Water and essence vapors from separator 649 are conducted to the chest of preheater 645 and to the chest of heat exchanger 651.

Condensate from 645 and 651 is combined in line 655 and 656 to be directed either to waste or stripping column 632. Non-condensed vapors are conducted through line 652 through vacuum regulator 653 where they are subjected to absolute pressure of 10–25 mm. Hg as provided by gas jet 609 and the liquid ring pumps 610 and 611. The vapors are then combined with vapors from line 606 and are conducted into direct contact condenser 607 where the essence is concentrated and recovered as described above.

It will be appreciated that this system is highly useful in the citrus field and particularly in heat sensitive materials such as orange juice, although it may be employed in other fruit juice fields.

The equipment and methods involved here may also be employed in recovering highly volatile water soluble essences which are removed in other forms of vacuum concentration such as in the manufacture of concentrated or instant coffee, tea or the like.

It will be understood that the forms of the invention described above are described as illustrative only and that there is no intention to limit the invention to the particular forms of systems or to the particular procedures described.

It will be appreciated that when the apparatus is referred to as adapted to recover essence from fruit juice such apparatus will also be adapted to or suitable for use in connection with the recovery of highly volatile essences such as those involved in coffee or tea as well as those of other essential oils having volatile flavor elements which might be lost in concentration and it is intended to encompass the same.

The method is referred to as for separating essence from orange juice or the like which is intended to encompass other fruit juices or other substances such as coffee, tea or essential oils involving volatile flavor or essence elements which might be lost during concentration.

It is also suggested that the orange oil be used as a final scrubbing medium. Reference to orange oil or the like is intended to include other natural constituents of the juice or essence concentrated to a high level of alcohol.

What is claimed is:

1. The method of separating essence from orange juice, coffee or the like, and collecting and concentrating said essence, comprising evaporating said essence, non-condensable gases and water from said orange juice, coffee or the like, by reducing the pressure above said orange juice, coffee or the like to approximately 25 mm. of mercury and removing the evaporated essence, non-condensable gases and the water from the presence of the juice, separating said essence and non-condensable gases from the evaporated water, bringing said essence and non-condensable gases into intimate association with aqueous liquid at the reduced pressure, increasing the pressure on said essence, non-condensable gases and aqueous liquid to atmospheric pressure to promote dissolution of said essence in said aqueous liquid, refrigerating said aqueous liquid and venting the non-condensable gases and collecting the resultant solution of essence in said aqueous liquid at the increased pressure.

2. The method of separating essence from orange juice, coffee or the like, and collecting and concentrating said essence comprising evaporating said essence, non-condensable gases and water from orange juice, coffee or the like in vacuum by confining said orange juice, coffee or the like in a closed space and then creating a vacuum above said orange juice, coffee or the like by removing said essence and non-condensable gases and evaporated water with a liquid ring vacuum pump and a condenser for said evaporated water, said pump being of the class having a radially bladed rotor, a centrally disposed inlet, a centrally disposed outlet and an eccentric casing to receive and confine a stream of liquid driven by the blades of the rotor eccentrically of and in contact with the blades thereof to create suction at the inlet by movement of the liquid relative to and away from the axis of the rotor and to create compression between the blades and at the outlet by movement of the liquid relative to and toward the axis of the rotor by introducing aqueous liquid to said pump to form said liquid ring whereby said essence and non-condensable gases are withdrawn at reduced pressure after condensation of said evaporated water and are brought into intimate contact and are entrained in said aqueous liquid of said seal and whereby pressure on said essence, non-condensable gases and aqueous liquid is increased to promote the dissolution of said essence in said aqueous liquid and venting said non-condensable gases at pressure above that of the inlet to the pump and collecting said essence by withdrawing aqueous liquid having essence in solution therein at pressure above that of the pump inlet.

3. Apparatus adapted to recover and concentrate essence from fruit juice, coffee or the like, comprising in combination an evaporator having a closed vapor space, means for exhausting the gases and vapors including essence and non-condensable gases from said vapor space comprising a liquid ring vacuum pump of the class having a radially bladed rotor, a centrally disposed inlet, a centrally disposed outlet and an eccentric casing to receive and confine a stream of liquid driven by the blades of the rotor eccentrically of and in contact with the blades thereof, to create suction at the inlet by movement of the liquid relative to and away from the axis of the rotor and to create compression between the blades and at the outlet by movement of the liquid relative to and toward the axis of the rotor, whereby the essence and non-condensable gases are drawn into the pump and are brought into intimate contact and are entrained with the liquid of said seal whereby pressure on said essence and non-condensable gases and the liquid of the seal is increased to promote dissolution of the essence in the liquid and the non-condensable gases are vented at a pressure above that of the inlet of the pump and condenser means for receiving the essence and non-condensable gases and water vapor removed from said vapor space as said essence gases and water vapor pass from said vapor space toward said pump and for condensing said water vapor and removing it from said essence and gas prior to entry thereof into said pump, means connecting said vapor space with said condenser means, means for conducting said essence, non-condensable gases and water vapor from said vapor space to said condenser means for conducting the essence and non-condensable gases from said condenser means to the inlet of said pump whereby water vapor may be removed from gases passing from said vapor space to said pump and a closed circuit system for supplying liquid to the liquid seal of said pump and for withdrawing liquid therefrom including refrigeration means and means for withdrawing liquid from and adding liquid to said circuit and means for circulating said liquid in said closed circuit system.

4. Apparatus adapted to recover and concentrate essence from fruit juice, coffee or the like, comprising in combination an evaporator having a closed vapor space, means for exhausting the gases and vapors including essence and non-condensable gases from said vapor space comprising a liquid ring vacuum pump of the class having a radially bladed rotor, a centrally disposed inlet, a centrally disposed outlet and an eccentric casing to receive and confine a stream of liquid driven by the blades of the rotor eccentrically of and in contact with the blades thereof, to create suction at the inlet by movement of the liquid relative to and away from the axis of the rotor and to create compression between the blades and at the outlet by movement of the liquid relative to and toward the axis of the rotor, whereby the essence and non-condensable gases are drawn into the pump and are brought into intimate contact and are entrained with the liquid of said seal whereby pressure on said essence and non-condensable gases and the liquid of the seal is increased to promote dissolution of the essence in the liquid and the non-condensable gases are vented at a pressure above that of the inlet of the pump and condenser means for receiving the essence and non-condensable gases and water vapor removed from said vapor space as said essence gases and water vapor pass from said vapor space toward said pump and for condensing said water vapor and removing it from said essence and gas prior to entry thereof into said pump, means for conducting said essence, non-condensable gases and water vapor from said vapor space to said vapor space with said condenser means, means connecting said condenser means for conducting the essence and non-condensable gases from said condenser means to the inlet of said pump whereby water vapor may be removed from gases passing from said vapor space to said pump and a closed circuit system for supplying liquid to the liquid seal of said pump and for withdrawing liquid from and adding liquid to said circuit and means for circulating said liquid in said closed circuit system.

5. Apparatus adapted to recover and concentrate essence from fruit juice, coffee or the like, comprising in combination an evaporator having a closed vapor space and means for exhausting the gases and vapors including essence and non-condensable gases from said vapor space comprising a liquid ring vacuum pump of the class having a radially bladed rotor, an eccentrically disposed inlet, a centrally disposed outlet and an eccentric casing to receive and confine a stream of liquid driven by the blades of the rotor eccentrically of and in contact with the blades thereof, to create suction at the inlet by movement of the liquid relative to and away from the axis of the rotor and to create compression between the blades and at the outlet by movement of the liquid relative to and toward the axis of the rotor, whereby the essence and non-condensable gases are drawn into the pump and are brought into intimate contact and are entrained with the liquid of said seal whereby pressure on said essence and non-condensable gases and the liquid of the seal is increased to promote dissolution of the essence in the liquid and the non-condensable gases are vented at a pressure above that of the inlet of the pump, and means for removing water vapor from said essence and non-condensable gases located between said vapor space and said pump.

6. Apparatus adapted to recover and concentrate essence from fruit juice, coffee or the like, comprising in combination an evaporator having a closed vapor space, means for exhausting the gases and vapors including essence and non-condensable gases from said vapor space comprising a liquid ring vacuum pump of the class having a radially bladed rotor, an eccentrically disposed inlet, a centrally disposed outlet and an eccentric casing to receive and confine a stream of liquid driven by the blades of the rotor eccentrically of and in contact with the blades thereof, to create suction at the inlet by movement of the liquid relative to and away from the axis of the rotor and to create compression between the blades and at the outlet by movement of the liquid relative to and toward the axis of the rotor, whereby the essence and non-condensable gases are drawn into the pump and are brought into intimate contact and are entrained with the liquid of said seal whereby pressure on said essence and non-condensable gases and the liquid of the seal is increased to promote dissolution of the essence in the liquid and the non-condensable gases are vented at a pressure above that of the inlet of the pump and condenser means for receiving the essence and non-condensable gases and water vapor removed from said vapor space as said essence gases and water vapor pass from said vapor space toward said pump and for condensing said water vapor and removing it from said essence and gas prior to entry thereof into said pump and means for conducting said essence, non-condensable gases and water vapor from said vapor space to said vapor space with said condenser means and means connecting said condenser means for conducting the essence and non-condensable gases from said condenser means to the inlet of said pump whereby water vapor may be removed from gases passing from said vapor space to said pump and a closed circuit for supplying liquid to the liquid seal of said pump and for withdrawing liquid therefrom including refrigeration means and means for withdrawing liquid from and adding liquid to said circuit and means for circulating said liquid in said circuit and means for scrubbing vented gases with orange oil or the like and collecting said oil.

References Cited by the Examiner

UNITED STATES PATENTS

| | | | |
|---|---|---|---|
| 585,365 | 6/1897 | Skiffington. | |
| 1,851,266 | 3/1932 | Todd | 99—205 |
| 2,513,813 | 7/1950 | Milleville | 99—205 |
| 2,625,505 | 1/1953 | Cross | 99—205 X |
| 2,631,103 | 3/1953 | Kermer | 99—239 X |
| 2,921,682 | 1/1960 | White | 230—79 X |

ROBERT E. PULFREY, *Primary Examiner.*

JEROME SCHNALL, *Examiner.*